United States Patent
Agrawal et al.

(10) Patent No.: US 9,564,806 B2
(45) Date of Patent: Feb. 7, 2017

(54) BOOST CONVERTER WITH REDUCED SWITCHING LOSS AND METHODS OF OPERATING THE SAME

(71) Applicant: Cree, Inc., Durham, NC (US)

(72) Inventors: Binod Kumar Agrawal, Gurgaon (IN); Narasimha Reddy Bommireddy, Andhra Pradesh (IN)

(73) Assignee: Cree, Inc., Durham, NC (US)

( * ) Notice: Subject to any disclaimer, the term of this patent is extended or adjusted under 35 U.S.C. 154(b) by 0 days.

(21) Appl. No.: 14/036,611

(22) Filed: Sep. 25, 2013

(65) Prior Publication Data
US 2015/0084611 A1    Mar. 26, 2015

(51) Int. Cl.
*H02M 3/158* (2006.01)
*H02M 1/00* (2006.01)

(52) U.S. Cl.
CPC ..... *H02M 3/158* (2013.01); *H02M 2001/0054* (2013.01); *Y02B 70/1491* (2013.01)

(58) Field of Classification Search
CPC ........ H02M 3/06; H02M 3/156; H02M 3/158; H02M 3/1582; H02M 2001/0077; H02M 2001/009; H02M 1/088; H02M 3/155; H02M 3/258
USPC ................ 323/222, 235, 288, 282, 225, 232
See application file for complete search history.

(56) References Cited

U.S. PATENT DOCUMENTS

| | | | | |
|---|---|---|---|---|
| 4,720,668 A * | 1/1988 | Lee | ....... | H02M 3/155 323/235 |
| 5,057,990 A * | 10/1991 | Gulczynski | ....... | H02M 3/1582 323/350 |
| 5,502,630 A * | 3/1996 | Rokhvarg | ....... | H02M 1/4208 323/222 |
| 5,712,536 A * | 1/1998 | Haas | ....... | H05B 41/28 315/209 R |
| 6,498,463 B2 * | 12/2002 | Chang | ....... | 323/222 |
| 6,611,130 B2 * | 8/2003 | Chang | ....... | H02M 1/4208 323/225 |
| 6,727,602 B2 * | 4/2004 | Olson | ....... | H02J 7/0013 307/46 |
| 7,746,040 B2 * | 6/2010 | Garrity | ....... | H02M 1/4225 323/207 |
| 7,948,221 B2 * | 5/2011 | Watanabe | ....... | H02M 3/158 307/110 |
| 8,278,892 B2 * | 10/2012 | Friebe | ....... | H02M 1/36 323/271 |

(Continued)

OTHER PUBLICATIONS

Bausch "MOSFET vs IGBT" 2011 http://www.electronicproducts.com/Analog_Mixed_Signal_ICs/Discrete_Power_Transistors/MOSFET_vs_IGBT.aspx.*

(Continued)

*Primary Examiner* — Jeffrey Gblende
*Assistant Examiner* — Kyle J Moody
(74) *Attorney, Agent, or Firm* — Myers Bigel, P.A.

(57) ABSTRACT

An apparatus, e.g., a boost converter, includes a first switch configured to be coupled to an inductor and to support a charging current in the inductor from a power source and at least two serially-coupled second switches coupled in parallel with the first switch and configured to selectively route current from the inductor to at least two serially-connected capacitors. The apparatus may further include a control circuit configured to operate the first switch and the plurality of second switches.

22 Claims, 7 Drawing Sheets

(56) References Cited

U.S. PATENT DOCUMENTS

| | | | | |
|---|---|---|---|---|
| 8,614,568 | B2* | 12/2013 | Uruno | H02M 1/08 323/271 |
| 2006/0170399 | A1* | 8/2006 | Griffin | G05F 1/70 323/225 |
| 2010/0052638 | A1* | 3/2010 | Lesso | H02M 3/158 323/282 |
| 2012/0051097 | A1* | 3/2012 | Zhang et al. | 363/21.07 |
| 2013/0063119 | A1* | 3/2013 | Lubomirsky | H02J 3/383 323/304 |
| 2015/0097492 | A1* | 4/2015 | Ma | H05B 33/0815 315/186 |
| 2015/0097546 | A1* | 4/2015 | Pan | H02M 3/158 323/311 |
| 2015/0349638 | A1* | 12/2015 | Sylla | H02M 3/1584 307/10.1 |

OTHER PUBLICATIONS

T. Kerekes, R. Teodorescu, P. Rodriguez, G. Vazquez, and E. Aldabas, "A new high-efficiency single-phase transformerless PV inverter topology", *IEEE Trans. on Indust. Electronics* 58 (1), 184-191 (2011).

O. Abutbul, A. Gherlitz, Y. Berkovich, and A. Ioinovici, "Step up switching mode converter with high voltage gain using a switched-capacitor circuit", *Circuits and Systems I: Fundamental Theory and Applications, IEEE Trans. on Circuits and Systems 50*, 1098-1102 (2003).

K.K. Law, K.W.E. Cheng, and Y.P.B. Yeung, "Design and analysis of switched-capacitor-based step-up resonant converters", *Circuits and Systems I: Regular Papers, IEEE Trans. on Circuit Systems 52*, 943-948 (2005).

W. Rong-Jong and D. Rou-Yong, "High step-up converter with coupled inductor", *Power Electronics, IEEE Trans. on Power Electronics 20*, 1025-1035 (2005).

R.J. Wai and R. Y. Duan, "High-efficiency DC/DC converter with high voltage gain", *Electric Power Applications, IEE Proc. 152*, 793-802 (2005).

B. Ju-Won, R. Myung-Hyo, K. Tae-Jin, Y. Dong-Wook, and K. Jong-Soo, "High boost converter using voltage multiplier", *Indust. Electronics Society, 31st Annual Conf. IEEE 1*, 567-572 (2005).

M. Nymand, R. Tranberg, M.E. Madsen, U.K. Madawala, and M.A.E. Andersen, "What is the best converter for low voltage fuel cell applications—a buck or boost?", *Proc. IEEE IECON 1*, 959-964 (2009).

M. Nymand and M.A.E. Anderson, "High-efficiency isolated boost dc-dc converter for high-power low-voltage fuel cell applications", *IEEE Trans. Indust. Electronics* 57 (2), 505-514 (2010).

M. Nymand and M.A.E. Andersen, "A new approach to high efficiency in isolated boost converters for high-power low voltage fuel cell applications", *Proc. EPE-PEMC 1*, 127-131 (2008).

M. Nymand and M.A.E. Andersen, "New primary-parallel boost converter for high-power high gain applications", *Proc. APEC 1*, 35-39 (2009).

M. Nymand, U.K. Madawala, M.A.E. Andersen, B. Carsten, and O.S. Seirsen, "Reducing ac winding losses in high-current high-power inductors", *Proc. IEEE IECON 1*, 774-778 (2009).

W, Li. and X. He, "An interleaved winding-coupled boost converter with passive lossless clamp circuits", *IEEE Trans. on Power Electronics* 22 (4), 1499-1507 (2007).

W. Li. and X. He, "A family of interleaved DC-DC converters deduced from a basic cell with winding-cross-coupled inductors (WCCIs) for high step-up or step-down conversions", *IEEE Trans. on Power Electronics* 23 (4), 1791-1801 (2008).

K. Hirachi, M. Yamanaka, K. Kajiyama, and S. Isokane, "Circuit configurations of bidirectional DC/DC converter specific for small scale loading system", *Proc. PCC-Osaka 2*, 603-609 (2002).

S. Dwari, S, Jayawant, T. Beechner, S.K. Miller, A. Mathew, M. Chen, J. Riehl, and J. Sun, "Dynamics characterization of coupled-inductor boost DC-DC converters", *Proc. Computers in Power Electronics, IEEE Workshop 1*, 264-269 (2006).

S. Pirog, R. Stala, and L. Stawiarski, "Power electronic converter for photovoltaic systems with the use of FPGA-based real-time modeling of single phase grid-connected systems", *Bull. Pol. Ac.: Tech.* 57 (4), 345-354 (2009).

Y. Jiang and J. Pan, "Single phase full bridge inverter with coupled filter inductors and voltage doubler for PV module integrated converter system", *Bull. Pol. Ac.: Tech.* 57 (4), 355-361 (2009).

C.M.C. Duarte, and I. Barbi, "An improved family of ZVSPWM active clamping DC-to-DC converters", *IEEE Trans. Power Electronics* 17 (1), 1-7 (2002).

W. Rong-Jong, and D. Rou-Yong, "High-efficiency power conversion for low power fuel cell generation system", *IEEE Trans. Power Electronics* 20 (4), 847-856 (2005).

S. Dwari and L. Parsa, "A novel high efficiency high power interleaved coupled-inductor boost DC-DC converter for hybrid and fuel cell electric vehicle", *Proc. IEEE Vehicle Power Propulsion Conf. 1*, 399-404 (2007).

S. Dwari and L. Parsa, "An efficient high-step-up interleaved DC-DC converter with a common active clamp", *IEEE Trans. on Power Electronics* 26 (1), 66-78 (2011).

P. Zacharias, B. Sahan, S.V. Ara'ujo, F.L.M. Antunes, and R.T. Bascop'e, "Analysis and proposition of a PV module integrated converter with high voltage gain capability in a nonisolated topology", *7th Int. IEEE Conf. on Power Electronics 1*, CD-ROM (2007).

P. Klimczak and S. Munk-Nielson, "High efficiency boost converter with three state switching cell", *Int. Exhibition & Conf. Power Electronics, Intelligent Motion, Power Quality PCIM 1*, 143-148 (2009).

P. Klimczak, "Modular power electronic converters in the power range 1 to 10 kW", *PhD Thesis*, Aalborg University, Denmark Institute of Energy Technology, Aalborg, 2009.

International Search Report and Written Opinion; PCT/US14/57162; Dec. 30, 2014 (12 pages).

International Preliminary Report on Patentability; PCT/US2014/057162; Apr. 7, 2016 (10 pages).

* cited by examiner

BOOST CONVERTER WITH REDUCED SWITCHING LOSS AND METHODS OF OPERATING THE SAME

FIELD

The present inventive subject matter relates to power conversion apparatus and methods and, more particularly, to boost converter circuits and methods of operating the same.

BACKGROUND

Boost converters are used in a wide variety of applications, such as in motor drives and in interfaces for solar and wind power generators. Many such applications require boosting of an input voltage to a much higher voltage. For example, a solar application may require boosting of a relatively low voltage produced by a solar string to a much higher voltage required for an inverter that is coupled to the power grid.

Various converter configurations have been developed to provide such high levels of boost. These converter arrangements include cascaded boost circuits that include multiple boost stages, as well as coupled inductor, interleaved and multi-level boost converter arrangements. Such conventional boosts converters may suffer reduced efficiency due to excessive switching losses and/or may stress transistors and other components of the circuits.

SUMMARY

Some embodiments provide an apparatus including a first switch configured to be coupled to an inductor and to support a charging current in the inductor. The apparatus further includes at least two serially-coupled second switches coupled in parallel with the first switch and configured to selectively route current from the inductor to at least two serially-connected capacitors. The apparatus may further include a control circuit configured to operate the first switch and the plurality of second switches. In some embodiments, the control circuit may be configured to operate the first switch to charge the inductor and to operate the at least two serially coupled second switches to selectively charge the at least two serially coupled capacitors from the inductor and thereby develop a voltage across a load coupled in parallel with the at least two serially-coupled capacitors.

The control circuit may be configured to operate the first switch at a higher frequency than each of the at least two serially coupled second switches. The control circuit may also be configured to constrain switching of the at least two serially-coupled second switches to occur at about zero volts in generating the voltage across the load. The control circuit may be further configured to limit a voltage across the first switch to less than about half of the voltage across the load.

In some embodiments, the control circuit may be configured to close the first switch to charge the inductor, open the first switch while a first one of the at least two serially-coupled second switches is open and a second one of the at least two serially-coupled second switches is closed to discharge the inductor to a first one of the at least two serially-coupled capacitors, close the first switch to charge the inductor again and open the first switch while the second one of the at least two serially-coupled second switches is open and the first one of the at least two serially-coupled second switches is closed to discharge the inductor to a second one of the at least two serially-coupled capacitors. The control circuit may be configured to change the states of the at least two serially coupled second switches when the first switch is closed.

In some embodiments, the first switch may include a transistor of a first type and the at least two serially coupled second switches may be transistors of a second type. For example, in some embodiments, the first switch may include a silicon carbide (SiC) field-effect transistor (FET) and the at least two serially coupled second switches may include insulated gate bipolar transistors (IGBTs).

The apparatus may include the inductor and the at least two serially coupled capacitors. The apparatus may further include a rectifier circuit configured to couple the at least two serially coupled second switches to the at least two serially coupled capacitors.

Further embodiments of the inventive subject matter provide a boost converter including an inductor having a first terminal configured to be coupled to a power source, a FET coupled between a second terminal of the inductor and the power source, at least two serially-coupled capacitors configured to be coupled in parallel with a load, at least two serially-coupled bipolar transistors coupled in parallel with the FET and configured to selectively couple the at least two serially-coupled capacitors to the inductor, a rectifier circuit configured to couple the at least two serially-coupled bipolar transistors to the at least two serially-coupled capacitors and a control circuit configured to operate the FET and the at least two serially-coupled bipolar transistors to charge the inductor and selectively transfer energy from the inductor to the at least two serially-coupled capacitors.

In some embodiments, the control circuit may be configured to turn on the FET to charge the inductor, turn off the FET while a first one of the at least two serially-coupled bipolar transistors is off and a second one of the at least two serially-coupled bipolar transistors is on to discharge the inductor to a first one of the at least two serially-coupled capacitors, turn on the FET to charge the inductor again, and turn off the FET while the second one of the bipolar transistors is off and the first one of the at least two serially-coupled bipolar transistors is on to discharge the inductor to a second one of the at least two serially-coupled capacitors. The control circuit may be configured to change the states of the at least two second bipolar transistors when the FET is on. The control circuit may be configured to delay transition of gate signals to the at least two serially-coupled bipolar transistors after transition of a gate signal to the FET for a period at least as long as about a turn-on time of the FET.

The control circuit may also be configured to constrain switching of the at least two serially coupled bipolar transistors to occur at about zero volts. The control circuit may be further configured to limit a voltage across the FET to less than about half of a voltage across the load.

In some embodiments, the FET may include a SiC MOSFET. In further embodiments, the bipolar transistors may include IGBTs.

Still further embodiments provide methods including coupling at least two serially-coupled capacitors in parallel with a load and repeatedly charging an inductor from a power source and discharging the charged inductor to different ones of the at least two serially-coupled capacitors to generate a voltage across the load that is greater than a voltage across the power source. Charging the inductor may include closing a first switch to couple the inductor in series with the power source. Discharging the inductor may include opening the first switch while different ones of at least two serially-coupled second switches are open to charge different ones of the at least two-serially connected capacitors. Charging the inductor may include closing the first switch to charge the inductor. Discharging the inductor may include opening the first switch while a first one of the at least two serially coupled second switches is open and a second one of the at least two serially coupled second switches is closed to discharge the inductor to a first one of the at least two serially coupled capacitors. Charging the inductor may further include closing the first switch to charge the inductor again. Discharging the inductor may further include opening the first switch while the second one of the at least two serially coupled second switches is open and the first one of the at least two serially coupled second switches is closed to discharge the inductor to a second one of the at least two serially coupled capacitors.

BRIEF DESCRIPTION OF THE DRAWINGS

The accompanying drawings, which are included to provide a further understanding of the inventive subject matter and are incorporated in and constitute a part of this application, illustrate certain embodiment(s) of the inventive subject matter. In the drawings.

DETAILED DESCRIPTION

Figure 1A:
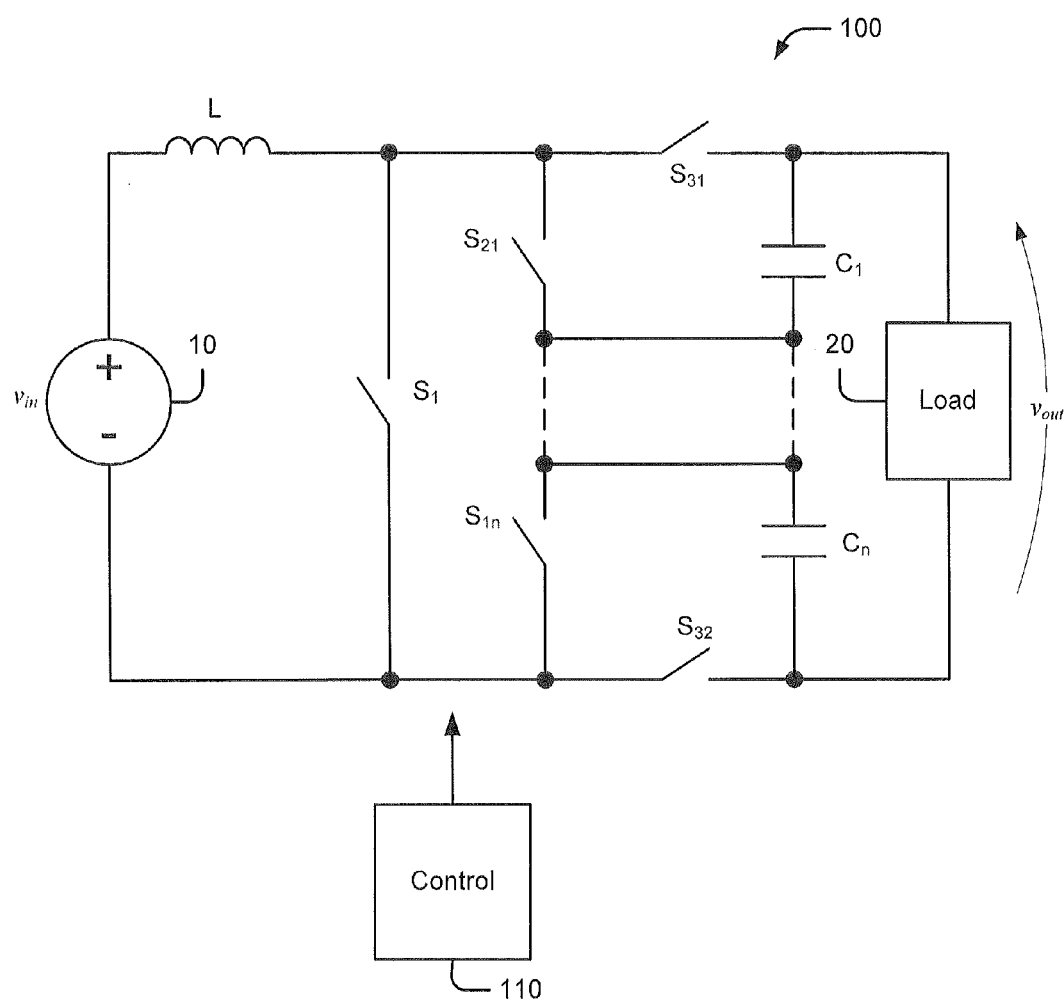
FIGS. 1A-B are schematic diagrams illustrating boost converters according to some embodiments.

Embodiments of the present inventive subject matter now will be described more fully hereinafter with reference to the accompanying drawings, in which embodiments of the inventive subject matter are shown. This inventive subject matter may, however, be embodied in many different forms and should not be construed as limited to the embodiments set forth herein. Rather, these embodiments are provided so that this disclosure will be thorough and complete, and will fully convey the scope of the inventive subject matter to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present inventive subject matter. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. It will be further understood that elements "coupled in series" or "serially connected" may be directly coupled or may be coupled via intervening elements.

Spatially relative terms, such as "below", "beneath", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation, in addition to the orientation depicted in the figures. Throughout the specification, like reference numerals in the drawings denote like elements.

The terminology used herein is for the purpose of describing particular embodiments only and is not intended to be limiting of the present inventive subject matter. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present inventive subject matter belongs. It will be further understood that terms used herein should be interpreted as having a meaning that is consistent with their meaning in the context of this specification and the relevant art and will not be interpreted in an idealized or overly formal sense unless expressly so defined herein. The term "plurality" is used herein to refer to two or more of the referenced item.

Some embodiments of the inventive subject matter arise from an inventive realization that improved efficiency and other benefits may be provided by boost converters that use a relatively low switching loss device, such as a MOSFET, to charge a boost inductor, in conjunction with a multilevel network of low conduction loss switches, e.g., IGBTs, that selectively charge capacitors of a series combination of capacitors that store energy for supplying a load. The use of the separate inductor charging switch can facilitate zero voltage switching of the devices of the multilevel switching network. Embodiments of the invention also may constrain voltages that are developed across the switching components, which can enable the use of less expensive parts and improve reliability.

FIG. 1A illustrates a boost converter 100 according to some embodiments. The boost converter 100 includes at least one boost inductor L having a first terminal configured to be coupled to a power source 10. A first switch $S_1$ is coupled to a second terminal of the inductor L and is configured to conduct charging current through the inductor L when closed. A plurality of series-coupled second switches $S_{21}, \ldots S_{2n}$ is also coupled to the second terminal of the inductor L, in parallel with the first switch $S_1$. The second switches $S_{21}, \ldots, S_{2n}$ are also coupled to a plurality of series-coupled capacitors $C_1, \ldots C_n$, which are configured to be coupled in parallel with a load 20. A rectifier circuit, here shown as including switches $S_{31}$, $S_{32}$ (e.g., diodes and/or active switches), also couples the capacitors $C_1, \ldots, C_n$ to the inductor L and the power source 10.

A control circuit 110 is configured to operate the first switch $S_1$ and the second switches $S_{21}, \ldots S_{2n}$ to generate an output voltage $v_{out}$ that is boosted with respect to the input voltage $v_{in}$ provided by the power source 10. In particular, the control circuit 110 may support an operational cycle comprising a first charging phase in which the first switch $S_1$ is closed to charge the inductor L, followed a first discharge phase in which the first switch $S_1$ is opened while at least one of the second switches $S_{21}, \ldots S_{2n}$ is open to cause the inductor L to discharge into at least one of the capacitors $C_1, \ldots, C_n$. This discharge phase may be followed by a second inductor charging phase in which the first switch $S_1$ is again closed and the inductor L charged. A second discharge phase begins with the first switch $S_1$ is opened while at least one different one of the second switches $S_{21}, \ldots, S_{2n}$ is open to allow charge transfer to another at least one of the capacitors $C_1, \ldots, C_n$ coupled in parallel. The cycle may include additional charge/discharge phases depending on, for example, the number of second switches $S_{21}, \ldots, S_{2n}$ and capacitors $C_1, \ldots, C_n$.

It will be appreciated that the first switch $S_1$ and the second switches $S_{21}, \ldots, S_{2n}$ may comprise transistors, such as insulated gate bipolar transistors (IGBTs) and/or field effect transistors (FETs). In some embodiments, advantageous performance may be achieved by using a relatively low switching loss transistor (e.g., a silicon carbide (SiC) or other MOSFET) for the first switch $S_1$ and relatively low conduction loss transistors (e.g., IGBTs) for the second switches $S_{21}, \ldots S_{2n}$. Using a charge/discharge cycle along the lines described above, switching of the second switches $S_{21}, \ldots S_{2n}$ may be constrained to occur at a frequency less than or equal to about half of the switching frequency of the first transistor $S_1$, thus limiting switching losses in the transistors used for the second switches $S_{21}, \ldots, S_{2n}$ in comparison to a conventional multi-level boost circuit. Moreover, switching of the transistors used for the second switches $S_{21}, \ldots S_{2n}$ may be constrained to occur when the first switch $S_1$ is closed (i.e., during inductor charging phases), such that the switching of the transistors used for the second switches $S_{21}, \ldots, S_{2n}$ occurs at or near zero volts. By constraining the at least one of the second switches $S_{21}, \ldots, S_{2n}$ to be closed at any given time, the voltage across the first switch $S_1$ can also be limited, thus reducing voltage withstand requirements for the first switch $S_1$. It will be appreciated that the control circuit 110 may be implemented using a variety of different types of analog and/or digital circuitry, such as a microcontroller and associated peripheral circuitry for sensing voltages and/or current and providing drive signals to the switching devices (e.g., transistors).

Figure 1B:
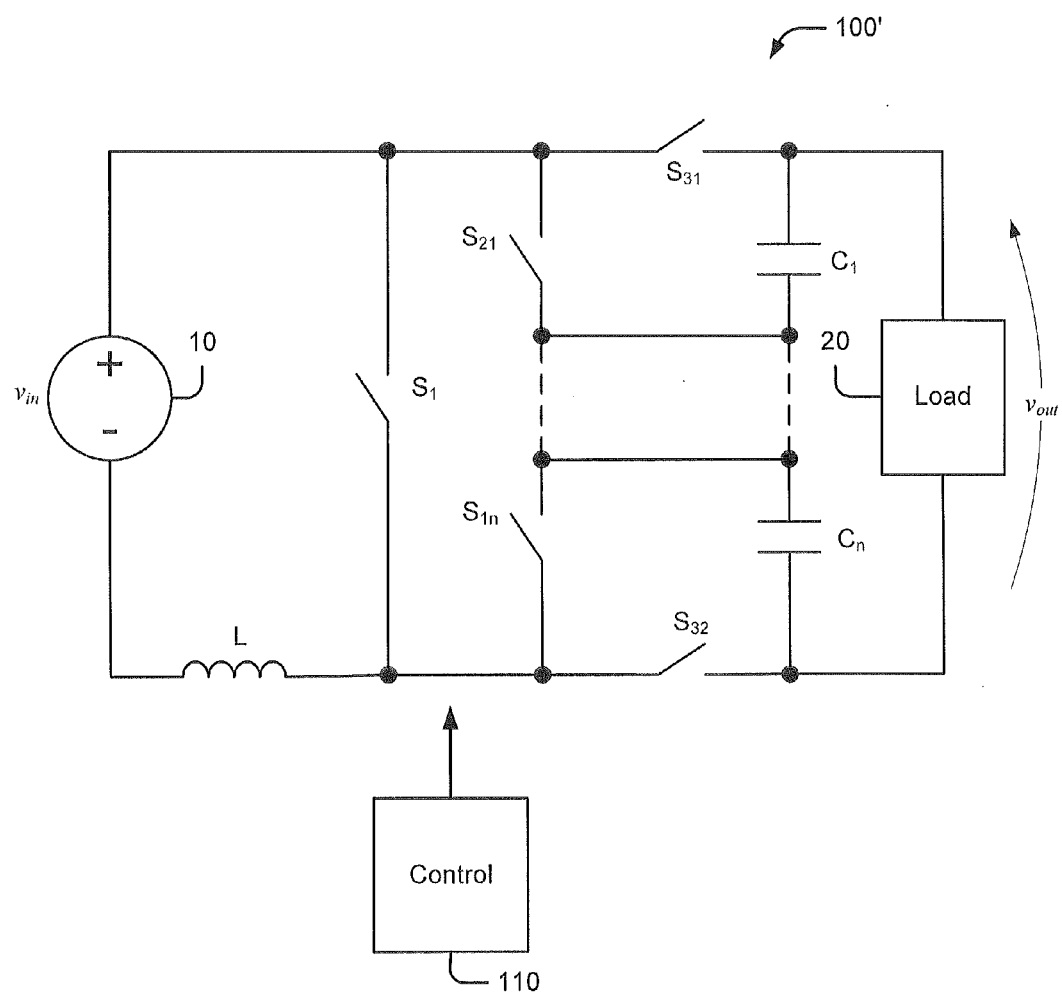

FIG. 1A illustrates one configuration according to some embodiments, but other arrangements may be used in other embodiments of the inventive subject matter. For example, FIG. 1B illustrates an arrangement of a boost converter 100' according to further embodiments in which the position of the boost inductor L is modified in relation to the boost converter 100 of FIG. 1A. It will be appreciated that other embodiments may use different arrangements.

Figure 2:
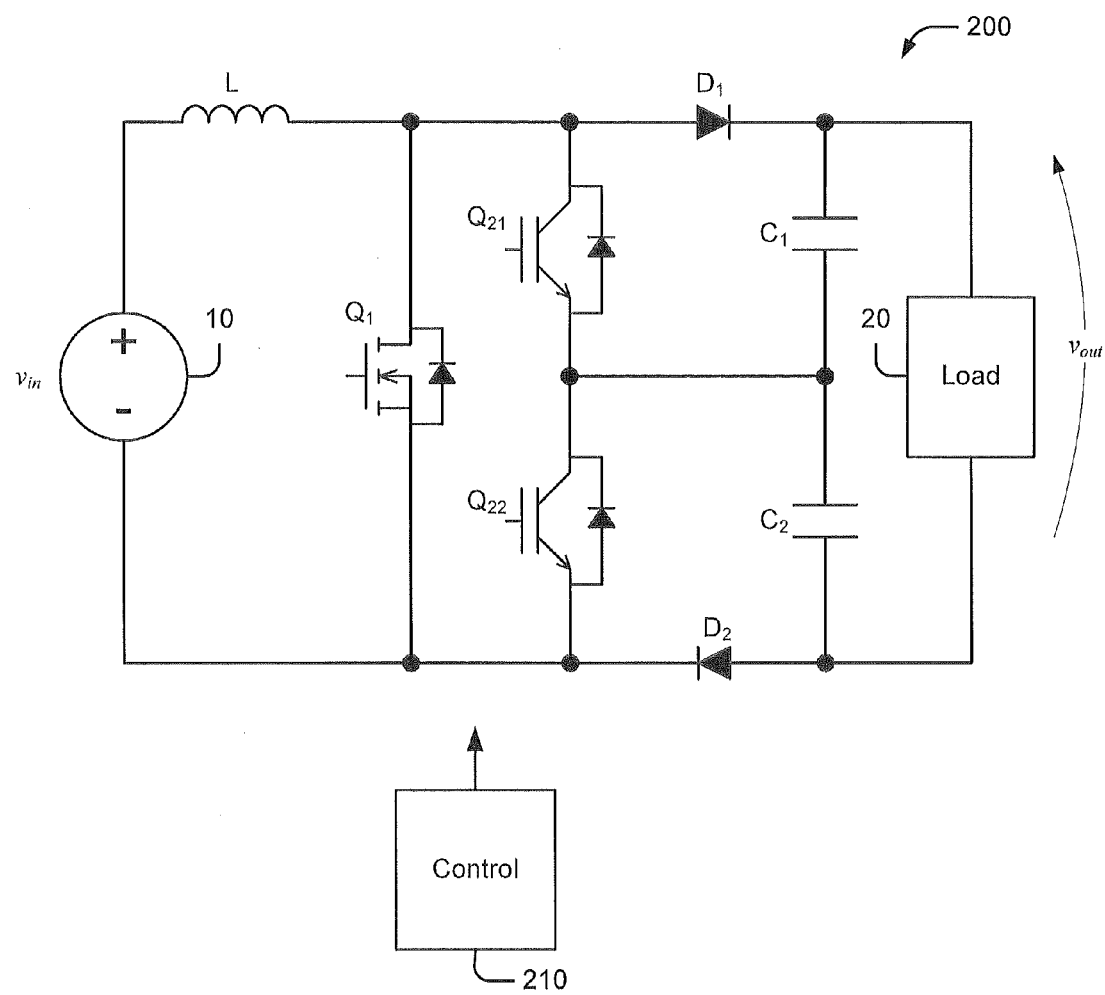
FIG. 2 is a schematic diagram illustrating a boost converter according to further embodiments.

FIG. 2 illustrates a boost converter 200 incorporating such features according to further embodiments of the inventive subject matter. The boost converter 200 includes an inductor L having a first terminal configured to be coupled to a power source 10. A SiC MOSFET $Q_1$ is coupled to a second terminal of the inductor L and is configured to charge the inductor L when turned on. First and second serially coupled IGBTs $Q_{21}$, $Q_{22}$ are coupled in parallel with the SiC MOSFET $Q_1$ and are also coupled to a node at which serially coupled capacitors $C_1$, $C_2$ are connected. The capacitors $C_1$, $C_2$ are configured to be coupled in parallel with a load 20, and first and second diodes $D_1$, $D_2$ couple the capacitors $C_1$, $C_2$ to the inductor L and the power source 10. A control circuit 210 controls the SiC MOSFET $Q_1$ and the IGBTs $Q_{21}$, $Q_{22}$.

Figure 3:
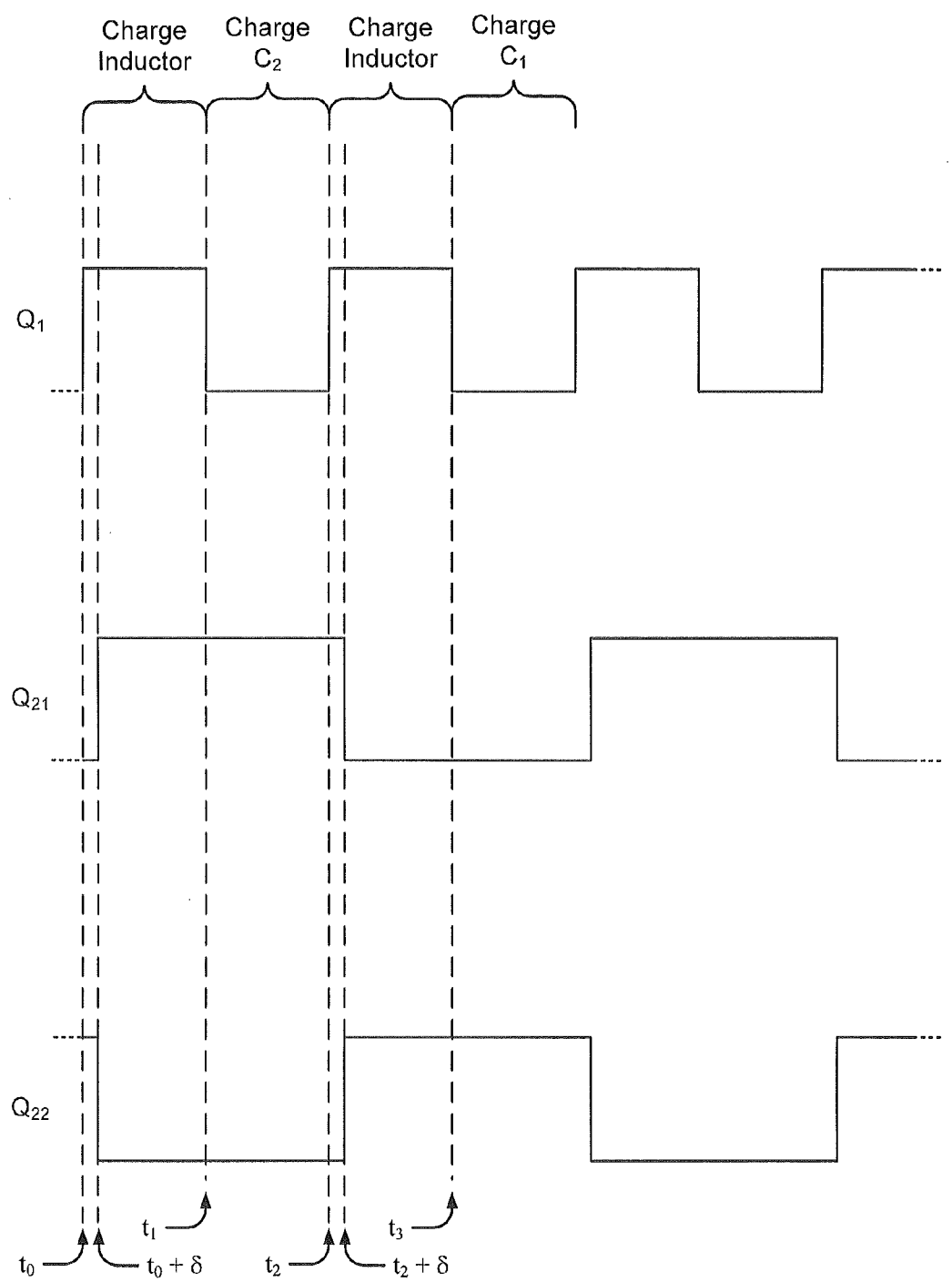
FIG. 3 is a waveform diagram illustrating operations of boost converter of FIG. 2.
Figure 4A:
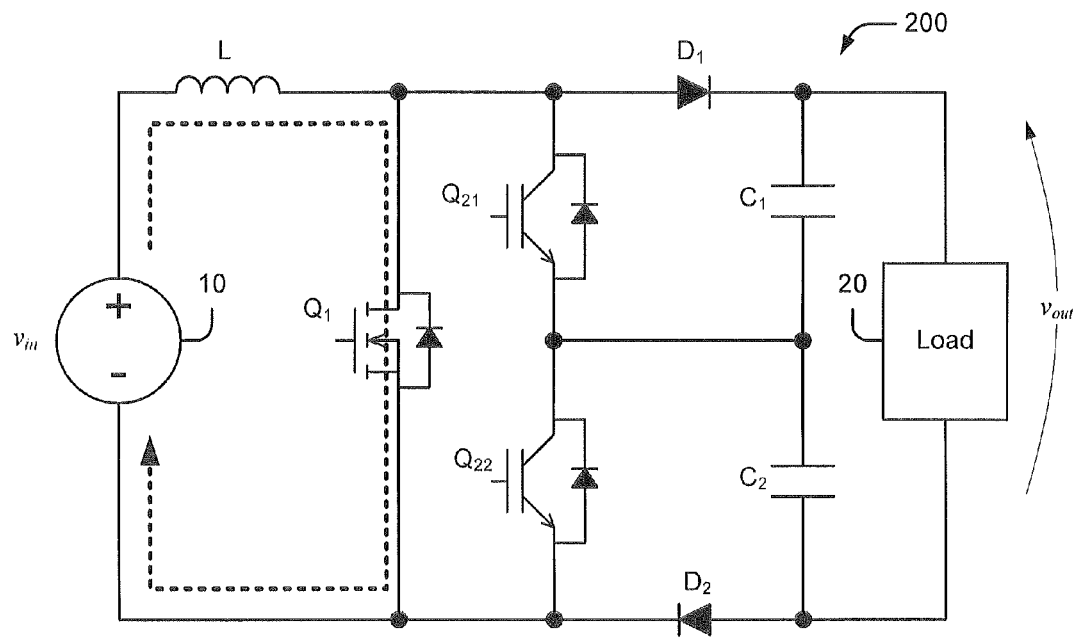
FIGS. 4A-D are schematic diagrams illustrating operations of the boost converter of FIG. 2.
Figure 4B:
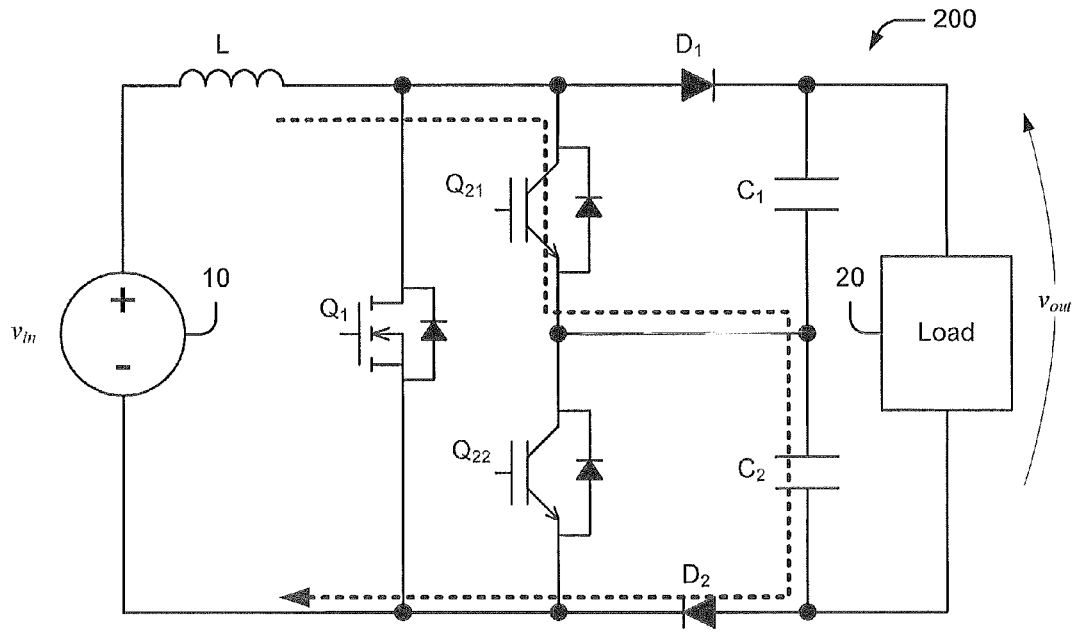

FIG. 3 illustrates drive signals that may be applied to the gate terminals of the SiC MOSFET $Q_1$ and the IGBTs $Q_{21}$, $Q_{22}$ to generate a boosted output voltage $v_{out}$ from the input voltage $v_{in}$ provided by the power source 10, while FIGS. 4A-D illustrate current flows for various inductor charging and discharge phases arising from these gate drive signals. Referring to FIGS. 3 and 4A, at a time $t_0$, the gate drive signal for the SiC MOSFET $Q_1$ transitions to turn the SiC MOSFET $Q_1$ on, starting an inductor charging phase in which current flows through the inductor L and the SiC MOSFET $Q_1$. At a time $t_0+\delta$ thereafter (e.g., a time sufficient to ensure that the SiC MOSFET $Q_1$ is fully on), gate drive signals for the IGBT's $Q_{21}$, $Q_{22}$ transition such that the first IGBT $Q_{21}$ is turned on and the second IGBT $Q_{22}$ is turned off. Referring to FIGS. 3 and 4B, at a subsequent time $t_1$, the SiC MOSFET $Q_1$ is turned off, ending the inductor charging phase and starting a discharge phase in which the inductor L discharges to the second capacitor $C_2$ via the first IGBT $Q_{21}$.

Figure 4C:
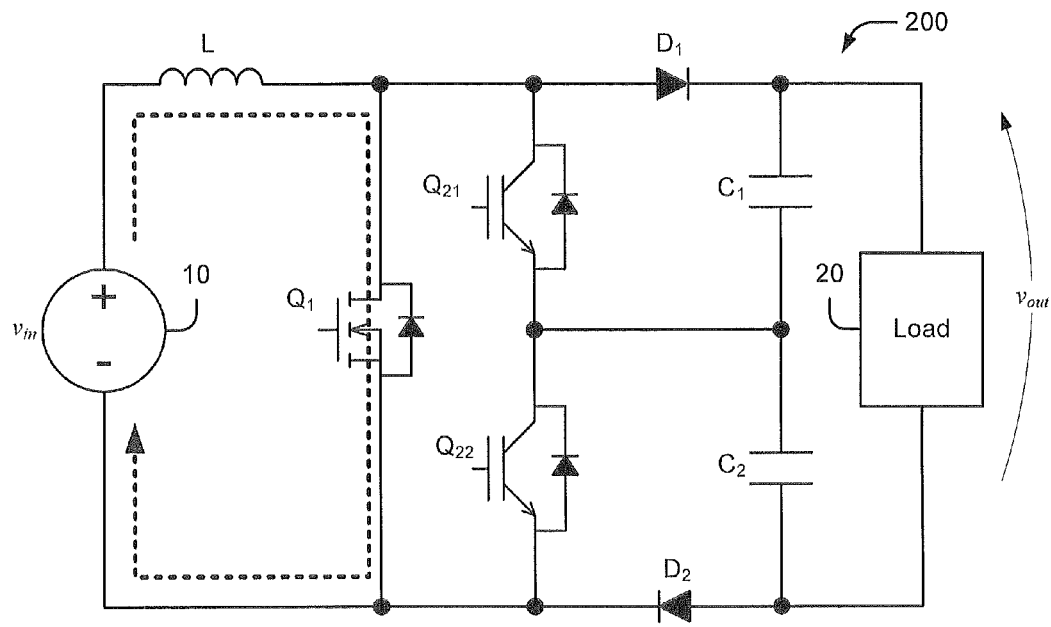
Figure 4D:
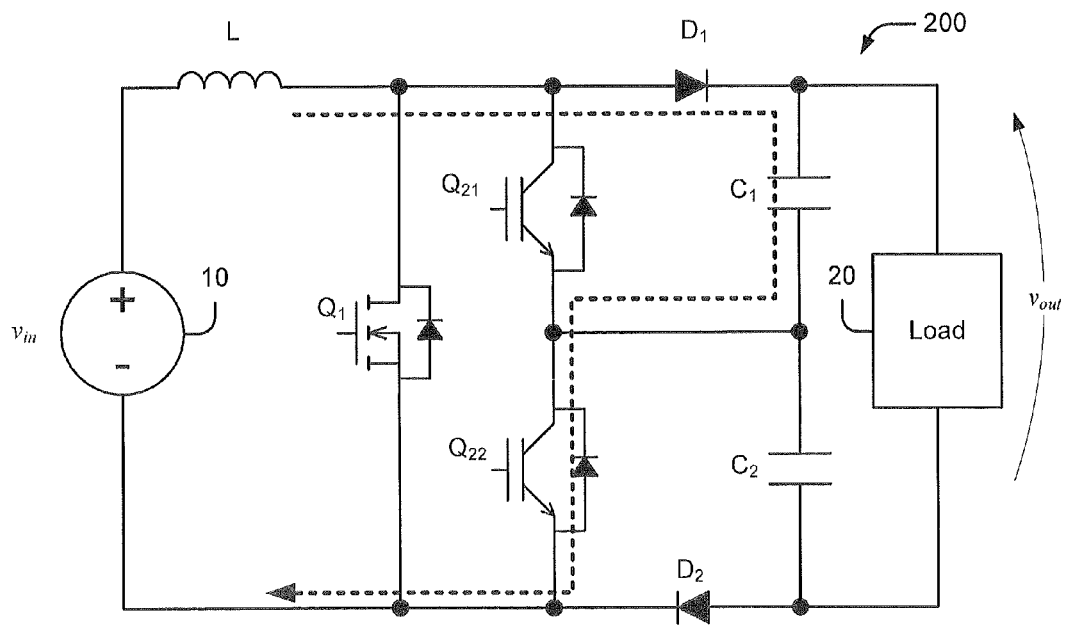

Referring to FIGS. 3 and 4C, at a time $t_2$, a new inductor charging phase begins as the SiC MOSFET $Q_1$ is turned on again, causing current to flow from the power source 10 through the inductor L and the SiC MOSFET $Q_1$. At a time $t_2+\delta$ thereafter, gate drive signals for the IGBT's $Q_{21}$, $Q_{22}$ transition such that the first IGBT $Q_{21}$ is turned off and the second IGBT $Q_{22}$ is turned on. Referring to FIGS. 3 and 4D, at a subsequent time $t_3$, the SiC MOSFET $Q_1$ is again turned off, starting another discharge phase in which the inductor L is discharged to the first capacitor $C_1$.

The cycle illustrated in FIGS. 4A-4D may be repeatedly performed. Although the waveforms illustrated in FIG. 3 show the SiC MOSFET $Q_1$ and the IGBTs $Q_{21}$, $Q_{22}$ being operated at fixed frequencies and at an approximately 50% duty cycle, it will be understood that the frequency and/or duty cycles of the SiC MOSFET $Q_1$ and the IGBTs $Q_{21}$, $Q_{22}$ may vary. For example, as the current demand of the load 20 varies, the output voltage $v_{out}$ may be regulated by controlling the length of the charge and/or discharge phases responsive to the output voltage $v_{out}$.

Figure 5:
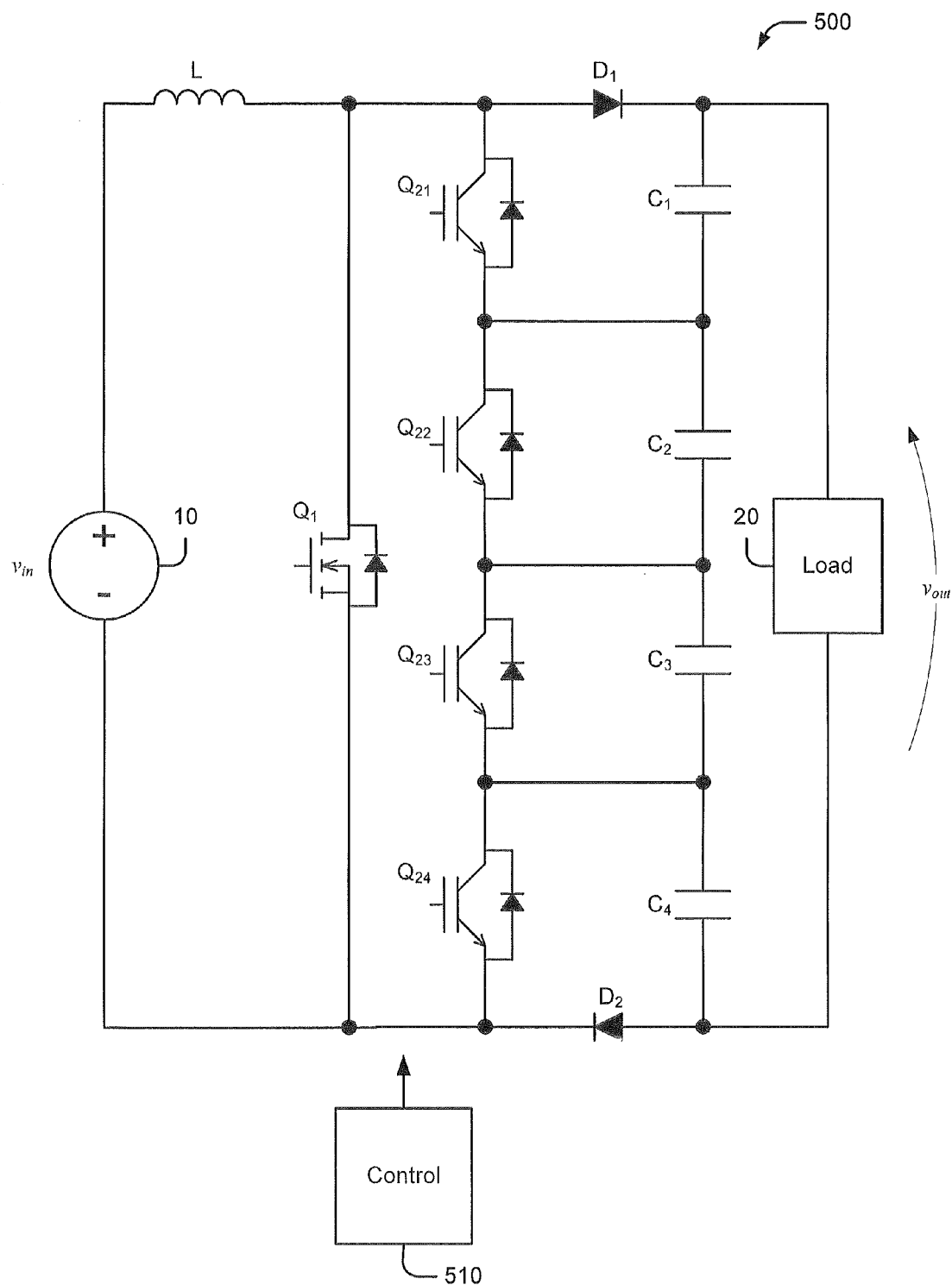
FIG. 5 is a schematic diagram illustrating boost converter according to further embodiments.

It will be further understood that additional capacitors and associated switches may be used to provide even greater boost. For example, referring to FIG. 5, a boost converter 500 according to some embodiments may include an inductor L having a first terminal configured to be coupled to a power source 10. A SiC MOSFET $Q_1$ is coupled to a second terminal of the inductor L and is configured to charge the inductor L when turned on. First, second, third and fourth serially-coupled IGBTs $Q_{21}$, $Q_{22}$, $Q_{23}$, $Q_{24}$ are coupled in parallel with the SiC MOSFET $Q_1$ and to nodes at which serially-coupled capacitors $C_1$, $C_2$, $C_3$, $C_3$ are connected. The capacitors $C_1$, $C_2$, $C_3$, $C_4$ are configured to be coupled in parallel with a load 20, and first and second diodes $D_1$, $D_2$ couple the capacitors $C_1$, $C_2$, $C_3$, $C_4$ to the inductor L and the power source 10. A control circuit 510 controls the SiC MOSFET $Q_1$ and the IGBTs $Q_{21}$, $Q_{22}$, $Q_{23}$, $Q_{24}$.

The SiC MOSFET $Q_1$ and the IGBTs $Q_{21}$, $Q_{22}$, $Q_{23}$, $Q_{24}$ may be operated in a manner similar to that described above with reference to FIGS. 3 and 4A-D. In particular, these devices may be operated in a cycle comprising inductor charging phases in which the SiC MOSFET $Q_1$ is turned on to charge the inductor L, interleaved with discharge phases in which various ones of the capacitors $C_1$, $C_2$, $C_3$, $C_4$ are charged by having selected ones of the IGBTs $Q_{21}$, $Q_{22}$, $Q_{23}$, $Q_{24}$ turned on and off when the SiC MOSFET $Q_1$ is turned off. As with the boost converter 200 of FIG. 2, frequencies and/or duty cycles of the SiC MOSFET $Q_1$ and the IGBTs $Q_{21}$, $Q_{22}$, $Q_{23}$, $Q_{24}$ may be varied to provide regulation of the output voltage $V_{out}$.

It will be understood that embodiments of the inventive subject matter may be implemented in various different forms. For example, the inventive subject may be embodied as a boost converter apparatus including an inductor, capacitors, switching devices and control circuitry. Such an apparatus may be employed in, for example, a power conversion or motor drive application, and may be a standalone unit configured to be connected to a motor and/or power source, or as a subunit of another assembly. In some embodiments, the inventive subject matter may be embodied as a module or similar subunit, such as a power transistor module that includes switching devices (e.g., the transistors $Q_1$, $Q_{21}$, $Q_{23}$ and diodes $D_1$, $D_2$ of FIG. 2) mounted on a common substrate, interconnected as described above, and configured to be coupled to external components, such as inductors and capacitors.

In the drawings and specification, there have been disclosed typical embodiments of the inventive subject matter and, although specific terms are employed, they are used in a generic and descriptive sense only and not for purposes of limitation, the scope of the inventive subject matter being set forth in the following claims.

What is claimed is:

1. An apparatus comprising:
an input port;
an inductor having a first terminal coupled to a first terminal of the input port;
a first switch configured to couple and decouple a second terminal of the input port and a second terminal of the inductor;
at least two serially-coupled capacitors;
at least two serially-coupled second switches coupled in parallel with the first switch and configured to selectively route current from the inductor to the at least two serially-coupled capacitors; and
a control circuit configured to close the first switch to charge the inductor from a power source at the input port in spaced apart first intervals and to operate the at least two serially-coupled second switches to discharge the charged inductor directly into different individual ones of the at least two serially-coupled capacitors in respective spaced apart second intervals interspersed with the first intervals and thereby develop a voltage across a load coupled in parallel with the at least two serially-coupled capacitors.

2. The apparatus of claim 1, wherein the control circuit is configured to operate the first switch at a higher frequency than each of the at least two serially-coupled second switches.

3. The apparatus of claim 1, wherein the control circuit is configured to constrain switching of the at least two serially-coupled second switches to occur at about zero volts in generating the voltage across the load.

4. The apparatus of claim 1, wherein the control circuit is configured to limit a voltage across the first switch to less than about half of the voltage across the load.

5. The apparatus of claim 1, wherein the first switch comprises a transistor of a first type and wherein the at least two serially-coupled second switches comprise transistors of a second type.

6. The apparatus of claim 5, wherein the first switch comprises a silicon carbide (SiC) field-effect transistor (FET) and wherein the at least two serially-coupled second switches comprise insulated gate bipolar transistors (IGBTs).

7. The apparatus of claim 1, further comprising a rectifier circuit configured to couple the at least two serially coupled second switches to the at least two serially-coupled capacitors.

8. An apparatus comprising:
an input port;
an inductor having a first terminal coupled to a first terminal of the input port;
a first switch configured to couple and decouple a second terminal of the input port and a second terminal of the inductor;
at least two serially-coupled capacitors;
at least two serially-coupled second switches coupled in parallel with the first switch and configured to selectively route current from the inductor to the at least two serially-coupled capacitors; and
a control circuit configured to close the first switch to charge the inductor, open the first switch while a first one of the at least two serially-coupled second switches is open and a second one of the at least two serially-coupled second switches is closed to discharge the inductor to a first one of the at least two serially-coupled capacitors, close the first switch to charge the inductor again and open the first switch while the second one of the at least two serially-coupled second switches is open and the first one of the at least two serially-coupled second switches is closed to discharge the inductor to a second one of the at least two serially-coupled capacitors.

9. The apparatus of claim 8, wherein the control circuit is configured to change states of the at least two serially-coupled second switches when the first switch is closed.

10. A boost converter comprising:
an inductor having a first terminal configured to be coupled to a power source;
an FET coupled between a second terminal of the inductor and the power source;
at least two serially-coupled capacitors configured to be coupled in parallel with a load;
at least two serially-coupled bipolar transistors coupled in parallel with the FET and configured to selectively couple the at least two serially-coupled capacitors to the inductor;
a rectifier circuit configured to couple the at least two serially-coupled bipolar transistors to the at least two serially-coupled capacitors; and
a control circuit configured to turn on the FET to charge the inductor from the power source in spaced apart first intervals and to operate the at least two serially-coupled bipolar transistors to discharge the charged inductor directly into different individual ones of the at least two serially-coupled capacitors in respective spaced apart second intervals interspersed with the first intervals and thereby develop a voltage across a load coupled in parallel with the at least two serially-coupled capacitors.

11. The boost converter of claim 10, wherein the control circuit is configured to turn on the FET to charge the inductor, turn off the FET while a first one of the at least two serially-coupled bipolar transistors is off and a second one of the at least two serially-coupled bipolar transistors is on to discharge the inductor to a first one of the at least two serially-coupled capacitors, turn on the FET to charge the inductor again, and turn off the FET while the second one of the bipolar transistors is off and the first one of the at least two serially-coupled bipolar transistors is on to discharge the inductor to a second one of the at least two serially-coupled capacitors.

12. The boost converter of claim 10, wherein the control circuit is configured to change states of the at least two second bipolar transistors when the FET is on.

13. The boost converter of claim 10, wherein the control circuit is configured to delay transition of gate signals to the at least two serially-coupled bipolar transistors after transition of a gate signal to the FET for a period at least as long as about a turn-on time of the FET.

14. The boost converter of claim 10, wherein the control circuit is configured to constrain switching of the at least two serially-coupled bipolar transistors to occur at about zero volts.

15. The boost converter of claim 10, wherein the control circuit is configured to limit a voltage across the FET to less than about half of a voltage across the load.

16. The boost converter of claim 10, wherein the FET comprises a SiC MOSFET.

17. The boost converter of claim 10, wherein the at least two serially-coupled bipolar transistors comprise IGBTs.

18. A method comprising:
coupling a first terminal of an inductor to a first terminal of a power source;
coupling at least two serially-coupled capacitors in parallel with a load; and
repeatedly coupling a second terminal of the inductor to a second terminal of the power source to charge the inductor in spaced apart first intervals and decoupling the second terminal of the inductor from the second terminal of the power source to discharge the charged inductor directly into different individual ones of the at least two serially-coupled capacitors in respective spaced apart second intervals interspersed with the first intervals to generate a voltage across the load that is greater than a voltage across the power source.

19. The method of claim 18, wherein charging the inductor comprises closing a first switch to couple the inductor in series with the power source and wherein discharging the inductor comprises opening the first switch while different ones of at least two serially-coupled second switches are open to charge different ones of the at least two serially-coupled capacitors.

20. The method of claim 19:
wherein charging the inductor comprises closing the first switch to charge the inductor;
wherein discharging the inductor comprises opening the first switch while a first one of the at least two serially-coupled second switches is open and a second one of the at least two serially-coupled second switches is closed to discharge the inductor to a first one of the at least two serially-coupled capacitors;
wherein charging the inductor further comprises closing the first switch to charge the inductor again; and
wherein discharging the inductor further comprises opening the first switch while the second one of the at least two serially-coupled second switches is open and the first one of the at least two serially-coupled second switches is closed to discharge the inductor to a second one of the at least two serially-coupled capacitors.

21. The method of claim 18, wherein the first switch comprises a FET and wherein the second switches comprise IGBTs.

22. The method of claim 21, wherein the FET comprises a SiC MOSFET.

* * * * *